United States Patent
Schreiber

(10) Patent No.: US 8,540,492 B2
(45) Date of Patent: Sep. 24, 2013

(54) INTAKE CONE IN A FIBER COMPOUND MATERIAL FOR A GAS-TURBINE ENGINE

(75) Inventor: Karl Schreiber, Am Mellensee (DE)

(73) Assignee: Rolls-Royce Deutschland Ltd & Co KG (DE)

( * ) Notice: Subject to any disclaimer, the term of this patent is extended or adjusted under 35 U.S.C. 154(b) by 829 days.

(21) Appl. No.: 12/731,712

(22) Filed: Mar. 25, 2010

(65) Prior Publication Data

US 2010/0258199 A1    Oct. 14, 2010

(30) Foreign Application Priority Data

Apr. 9, 2009  (DE) .................... 10 2009 016 802

(51) Int. Cl.
*B64C 11/14* (2006.01)
*F02C 7/04* (2006.01)

(52) U.S. Cl.
USPC .................................................. 416/245 R

(58) Field of Classification Search
USPC ................ 416/245 R, 193 R, 94, 218.1
See application file for complete search history.

(56) References Cited

U.S. PATENT DOCUMENTS

| | | | |
|---|---|---|---|
| 3,990,814 A | 11/1976 | Leone | |
| 5,833,435 A | 11/1998 | Smith | |
| 6,358,014 B1 * | 3/2002 | Chou et al. | 416/245 R |
| 6,447,255 B1 | 9/2002 | Bagnall et al. | |
| 2008/0022524 A1 * | 1/2008 | Schreiber | 29/889.21 |

FOREIGN PATENT DOCUMENTS

| | | |
|---|---|---|
| DE | 2622619 | 1/1977 |
| DE | 19503939 | 6/1996 |
| DE | 69726392 | 5/2004 |
| DE | 69930711 | 8/2006 |
| DE | 102005013421 | 9/2006 |
| DE | 102006011513 | 9/2007 |
| EP | 0294654 | 12/1988 |
| FR | 2908827 | 5/2008 |
| GB | 2363170 | * 12/2001 |
| GB | 2364748 | 2/2002 |
| GB | 2398353 | 8/2004 |

OTHER PUBLICATIONS

European Search Report dated Sep. 9, 2010 from counterpart application.
German Search Report dated Mar. 17, 2010 from counterpart application.

* cited by examiner

*Primary Examiner* — Nathaniel Wiehe
*Assistant Examiner* — Jeffrey A Brownson
(74) *Attorney, Agent, or Firm* — Timothy J. Klima; Shuttleworth & Ingersoll, PLC

(57) ABSTRACT

The intake cone for a gas-turbine engine is wound in one piece from fiber compound material with fiber layers crossing one another. It is provided with a fiber compound belt, wound in the circumferential direction of the intake cone, in the connecting area with a mounting flange, which is of segmented design and thus features reduced circumferential stiffness, of a metallic retaining ring attached to a fan rotor disk. The intake cone is easily manufacturable with almost constant wall thickness and in high quality, can reliably be subjected to non-destructive testing and, in combination with the mounting flange, which is flexible in the radial direction, ensures safe connection of the two components despite the different thermal and elastic behavior of the respective materials.

18 Claims, 1 Drawing Sheet

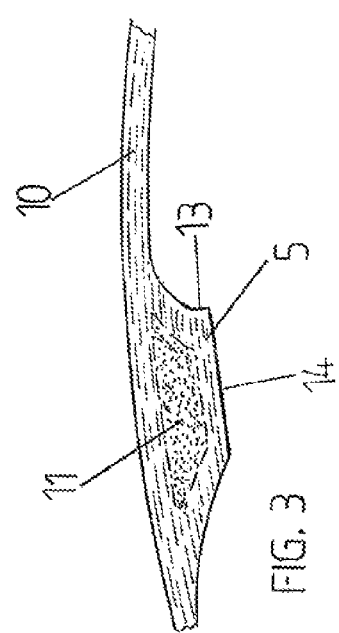
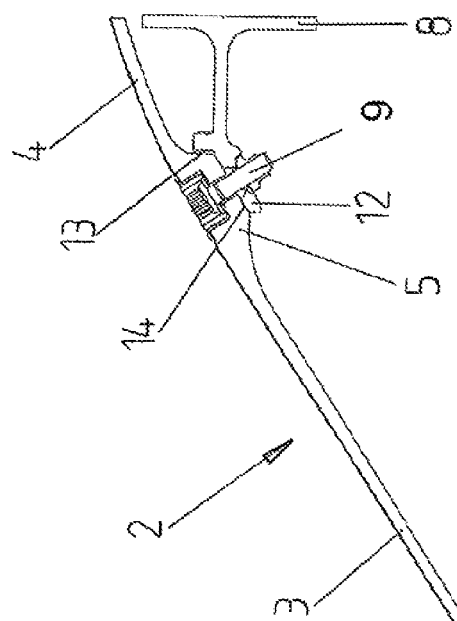
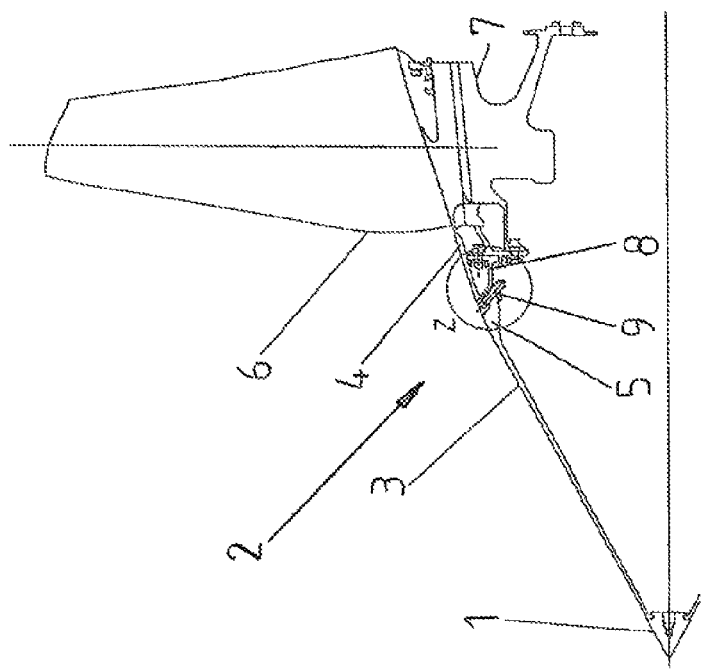
FIG. 1
FIG. 2
FIG. 3

INTAKE CONE IN A FIBER COMPOUND MATERIAL FOR A GAS-TURBINE ENGINE

This application claims priority to German Patent Application DE102009016802.8 filed Apr. 9, 2009, the entirety of which is incorporated by reference herein.

This invention relates to an intake cone for a gas-turbine engine which is wound in one piece from fiber compound material with fiber layers crossing one another and extending essentially longitudinally and is attached via a mounting collar formed on the inner side of the intake cone to a mounting flange of a retaining ring attached to the fan rotor disk.

The intake cone arranged upstream of the fan of a gas-turbine engine and attached to the rotor disk shall, on the one hand, provide for minimum swirling of the inlet flow into the engine and, on the other hand, avoid or limit damage by impinging foreign objects.

A one-piece, fiber-material intake cone known from Specification DE 10 2005 013 421 A1 includes a mounting collar, or reinforced mounting area, formed on the inner side, actually in the transition area between a conical part and an extension reaching up to the fan. This mounting area bears with an axial locating surface against a retaining ring attached to the fan. The intake cone is connected to the retaining ring in the area of the mounting collar using threaded bolts angled with respect to the axial locating surface. The connection thus provided is characterized by ease of assembly as well as high strength and a long service life. The conical part, the extension and the mounting collar are preferably producible in one piece from fiber compound material using mechanical winding technique.

Furthermore, an intake cone in fiber compound material with a mounting collar has already been proposed which has a locating surface which extends essentially parallel to the outer surface of the intake cone, i.e. is of conical design, and bears against an equally conical locating surface of a mounting flange provided on the retaining ring. Firm connection between the intake cone and the mounting flange of a retaining ring is again provided by fasteners, for example threaded bolts disposed vertically to the conical locating surface.

Connection between the intake cone in fiber compound material and the metallic retaining ring is problematic in that the greatly differing thermal expansion behavior of the two materials produces high residual stresses conflicting with a permanent and damage-free connection of the two components.

In a broad aspect, the present invention therefore provides that the connection area between an intake cone made of fiber compound material and a metallic retaining ring is designed such that reduced damage behavior and long service life are ensured.

The present invention provides for a combination of the following characteristics of the mounting flange and the mounting collar: For adaptation of the expansion behaviour of the metallic material of the mounting flange to the differing expansion behavior of the fiber compound material, the mounting flange of the retaining ring is provided with radial elasticity or flexibility, i.e. with reduced circumferential stiffness. Thus, the metallic mounting flange is enabled to follow the thermal expansion or contraction of the fiber compound material. The centrifugally effected loads acting at the mounting collar on the fiber compound material in consequence of the reduced circumferential stiffness of the mounting flange are taken up in that a circumferentially extending fiber compound belt is wound at the level of the connecting point between the intake cone and the retaining ring. Also, the fiber compound belt—which preferably is integrated into the wall of the intake cone—enables a wall thickness to be obtained in the area of connection with the retaining ring which corresponds approximately to the wall thickness in the other areas of the intake cone, while satisfying the requirements on a secure and permanent connection to the retaining ring by use of certain fasteners, for example threaded bolts. The proposed winding structure in the connecting area, in combination with the decreased circumferential stiffness of the mounting flange, reduces residual stresses generated in the connection by the different thermal characteristics and allows resultant relative movement between the components made of different materials to be reduced. In addition, as the fiber compound belt enables an intake cone with nearly constant wall thickness to be obtained, manufacturing effort is low, quality is improved and reliable non-destructive testing is made possible.

In an advantageous development of the present invention, the elasticity, or decrease in circumferential stiffness, of the mounting flange is obtained by segmentation of the latter, i.e. by providing the mounting flange from a plurality of attaching links spacedly arranged on the retaining ring.

In an embodiment of the present invention, the fiber compound material used for the manufacture of the intake cone, inclusive of the belt, includes carbon and glass fibers embedded in a resin. The fibers of the fiber compound belt provided circumferentially on the intake cone extend at a shallow angle to each other.

In a further embodiment of the present invention, the locating surface of the intake cone or the mounting collar, respectively, bearing on the segmented mounting flange of the retaining ring preferably essentially extends parallel to the external surface of the intake cone.

The present invention is more fully described in light of the accompanying drawing showing a preferred embodiment. In the drawing, FIG. 1 is a partial view of an intake cone connected to the fan of a gas-turbine engine via a retaining ring and a mounting collar, FIG. 2 is a sectional view of an intake cone in a further embodiment of the mounting collar threadedly connected to the retaining ring, and FIG. 3 is a detailed sectional view of the mounting collar not being arranged in the area of a threaded connection.

The intake cone 2 provided with a separately manufactured cone tip 1 includes a conical part 3 and a fairing part 4 as well as a mounting collar 5 provided in the transition area between the conical part and the fairing part. The conical part 3, the mounting collar 5 and the fairing part 4 are made in one piece from fiber compound material of carbon fibers, glass fibers and resin. Connection of the intake cone 2 to the fan 6 of a gas-turbine engine is by means of a retaining ring 8 attached to the fan rotor disk 7. As per FIG. 1, the mounting collar 5 is borne on the retaining ring 8 by an axial and a radial locating surface. In the embodiment shown in FIG. 2, the mounting collar 5 has an axial locating surface 13 and an inclined—conical—locating surface 14 extending parallel to the surface of the intake cone 5, with these locating surfaces resting on the correspondingly oriented locating surfaces of the retaining ring 8. For attachment, fasteners, here threaded bolts 9, are arranged in through-holes of the mounting collar 5 and the retaining ring 8. FIG. 2, in particular, shows that the intake cone 2, in the area of its mounting collar 5, is threadedly connected to a conical mounting flange 12 whose conicity corresponds to that of the intake cone 2. However, since the mounting flange 12 is segmented, i.e. includes a plurality of attaching links, it is radially elastically deformable to a certain degree, thereby providing for compensation of the different thermal expansion behavior of the interconnected components. The fairing part 4, which extends closely up to the fan rotor disk 7, is used to externally cover the retaining ring 8 and the corresponding fasteners.

The intake cone 2 is wound of mutually crossing carbon and glass fibers. In the area of the mounting collar, a fiber compound belt 11 made of glass and carbon fibers oriented at a shallow angle to each other and extending essentially vertically to the main fiber flow is however integrated in this fiber winding 10. This fiber compound belt 11 enables the forces transmitted from the mounting flange to the mounting collar to be taken up. Moreover, the wall of the intake cone 2 in the area of the mounting collar 5 is conceivable with a relatively small thickness and the intake cone manufacturable in a continuous conical shape with essentially constant wall thickness so that the manufacturing effort is lowered and high quality obtained and non-destructive testing—which is requisite for approval as critical component—ensured.

The design combination of an attaching area of the intake cone 2 which, owing to the provision of the integrated fiber compound belt, is relatively thin-walled, elastic and still capable of taking up the loads occurring, with a segmented and therefore also elastic retaining ring 8 whose conical mounting flange 12 is provided with circumferentially spaced attaching links allows the different thermal and elastic behavior of the metal retaining ring 8 and the fiber compound intake cone supported thereon to be compensated. Thus, the residual stresses generated by the different material properties in the connection between the two components and the relative movement resulting therefrom between the mating components are reduced, so that finally, the overall system, including the intake cone and the retaining ring, has an enhanced tolerance to damage.

LIST OF REFERENCE NUMERALS

1 Cone tip
2 Intake cone
3 Conical part
4 Fairing part
5 Mounting collar
6 Fan
7 Fan rotor disk
8 Retaining ring
9 Threaded bolt
10 Fiber winding of 2 in the longitudinal direction
11 Fiber compound belt—fiber winding in the circumferential direction
12 Conical mounting flange
13 Axial locating surface
14 Conical locating surface

What is claimed is:

1. An intake cone mounting system for a gas-turbine engine, comprising:
   an intake cone wound in one piece from fiber compound material with fiber layers crossing one another, the intake cone having a mounting collar formed on an inner side of the intake cone and a fiber compound belt wound around the intake cone in a circumferential direction in an area of the mounting collar for taking up forces acting upon the mounting collar, the fiber compound belt comprising a concentrated grouping of fibers oriented at a shallow angle to each other and extending essentially perpendicular to a main fiber orientation of the intake cone;
   a metallic retaining ring attachable to a fan rotor disk and having at least one mounting flange, wherein the mounting flange of the retaining ring is provided with radial flexibility for adaptation of an expansion behavior of the metal of the retaining ring to a differing expansion behavior of the fiber compound material of the intake cone.

2. The intake cone mounting system of claim 1, wherein the mounting flange is circumferentially segmented to be elastically deformable and have reduced circumferential stiffness.

3. The intake cone mounting system of claim 2, wherein the mounting flange includes a plurality of elastically moveable attaching links circumferentially spaced around the retaining ring.

4. The intake cone mounting system of claim 3, wherein the fiber compound belt is integrated into the fiber compound material of the intake cone.

5. The intake cone mounting system of claim 4, wherein the fiber compound belt includes carbon and glass fibers embedded in a resin and extending at a shallow angle to each other.

6. The intake cone mounting system of claim 5, wherein a locating surface of the mounting collar, bearing on the mounting flange, extends essentially parallel to an external surface of the intake cone.

7. The intake cone mounting system of claim 6, wherein the intake cone has a continuous conical shape at least one of constant and only slightly increasing wall thickness in the area of the mounting collar.

8. The intake cone mounting system of claim 1, wherein the fiber compound belt is integrated into the fiber compound material of the intake cone.

9. The intake cone mounting system of claim 8, wherein the fiber compound belt includes carbon and glass fibers embedded in a resin and extending at a shallow angle to each other.

10. The intake cone mounting system of claim 8, wherein a locating surface of the mounting collar, bearing on the mounting flange, extends essentially parallel to an external surface of the intake cone.

11. The intake cone mounting system of claim 8, wherein the intake cone has a continuous conical shape at least one of constant and only slightly increasing wall thickness in the area of the mounting collar.

12. The intake cone mounting system of claim 2, wherein the fiber compound belt is integrated into the fiber compound material of the intake cone.

13. The intake cone mounting system of claim 2, wherein the fiber compound belt includes carbon and glass fibers embedded in a resin and extending at a shallow angle to each other.

14. The intake cone mounting system of claim 2, wherein a locating surface of the mounting collar, bearing on the mounting flange, extends essentially parallel to an external surface of the intake cone.

15. The intake cone mounting system of claim 2, wherein the intake cone has a continuous conical shape at least one of constant and only slightly increasing wall thickness in the area of the mounting collar.

16. The intake cone mounting system of claim 1, wherein the fiber compound belt includes carbon and glass fibers embedded in a resin and extending at a shallow angle to each other.

17. The intake cone mounting system of claim 1, wherein a locating surface of the mounting collar, bearing on the mounting flange, extends essentially parallel to an external surface of the intake cone.

18. The intake cone mounting system of claim 1, wherein the intake cone has a continuous conical shape at least one of constant and only slightly increasing wall thickness in the area of the mounting collar.

* * * * *